United States Patent [19]

Slater, deceased et al.

[11] Patent Number: 5,331,074

[45] Date of Patent: Jul. 19, 1994

[54] ANTIFOULING COATING COMPOSITIONS

[75] Inventors: William W. Slater, deceased, late of Houston, Tex.; Margaret Slater, executrix, Berkeley Heights, N.J.; Rodney R. Brooks; Michael J. Winter, both of Tyne and Wear, United Kingdom

[73] Assignee: Courtaulds Coatings (Holdings) Limited, London, Great Britain

[21] Appl. No.: 956,772

[22] PCT Filed: Jun. 28, 1991

[86] PCT No.: PCT/GB91/01050

§ 371 Date: Dec. 17, 1992

§ 102(e) Date: Dec. 17, 1992

[87] PCT Pub. No.: WO92/00357

PCT Pub. Date: Jan. 9, 1992

[30] Foreign Application Priority Data

Jun. 29, 1990 [GB] United Kingdom ............. 9014564.0

[51] Int. Cl.$^5$ ............................................. C08G 77/06
[52] U.S. Cl. ........................................ 528/14; 528/15; 528/18; 528/19; 528/901; 528/33; 528/34; 528/38; 428/907; 427/387; 524/267; 524/731
[58] Field of Search .................. 528/901, 34, 33, 38, 528/14, 15, 18, 19, 901; 428/907; 427/387; 524/731

[56] References Cited

U.S. PATENT DOCUMENTS

| | | |
|---|---|---|
| 3,676,420 | 7/1972 | Fulton et al. . |
| 3,702,778 | 11/1972 | Mueller et al. . |
| 3,758,441 | 9/1973 | Nitzsche et al. ............... 528/901 |
| 4,105,617 | 8/1978 | Clark et al. .................... 528/901 |
| 4,525,565 | 6/1985 | Laisney et al. . |
| 4,973,623 | 11/1990 | Haugsby et al. . |
| 5,032,660 | 7/1991 | Kay et al. ........................ 528/901 |
| 5,192,603 | 3/1993 | Slater et al. .................... 428/217 |

FOREIGN PATENT DOCUMENTS

| | | |
|---|---|---|
| 0016195 | 12/1982 | European Pat. Off. . |
| 0089071 | 9/1983 | European Pat. Off. . |
| 0032597 | 11/1983 | European Pat. Off. . |
| 0329375 | 8/1989 | European Pat. Off. . |
| 0369259 | 5/1990 | European Pat. Off. . |
| 2018071 | 2/1971 | Fed. Rep. of Germany . |
| 1307001 | 2/1973 | United Kingdom . |
| 1470465 | 4/1977 | United Kingdom . |
| 1581727 | 12/1980 | United Kingdom . |
| 2141436 | 12/1984 | United Kingdom . |

*Primary Examiner*—Melvyn I. Marquis
*Attorney, Agent, or Firm*—Howson and Howson

[57] ABSTRACT

Silicone rubber coatings resistant to fouling by aquatic organisms are based on a hydroxy-functional polydiorganosiloxane and a crosslinking agent therefor. The hydroxy-functional polydiorganosiloxane may be packaged separately from the crosslinking agent, or a stable package comprising a hydroxy-functional polydiorganosiloxane terminated by excess crosslinking agent may be packaged separately from further hydroxy-functional polydiorganosiloxane. In either case the two packages can be combined to give the optimum ratio of crosslinking agent to silicon-bonded hydroxyl groups to ensure cure and give optimum resistance to fouling, whilst overcoming the problem of premature gelation during storage.

22 Claims, No Drawings

ANTIFOULING COATING COMPOSITIONS

FIELD OF THE INVENTION

This invention relates to coatings which inhibit fouling on an underwater surface by aquatic organisms such as algae and barnacles. By an underwater surface we mean a surface which is intended to be underwater or in contact with water at least some of the time in use. The water may be sea water or fresh water. Examples of underwater surfaces are ships' hulls, the underwater and splash zone surfaces of oil production platforms and cooling water inlets and outlets for power stations.

BACKGROUND TO THE INVENTION

Silicone rubber fouling-resistant compositions are described for example in GB-A-1307001, 1470465, 1581727 and 2141436, EP-B-16195 and 32597, EP-A-89071 and 329375 and U.S. Pat. No. 3,702,778 and U.S. Pat. No. 4,525,565. They have significant advantages over conventional antifouling compositions containing marine biocides which are gradually leached from the paint. The silicone rubber coatings rely on their low surface energy, rather than on biocides, to inhibit settlement of marine organisms. Conventional anti-fouling paints eventually become ineffective as all their biocide is released. Silicone rubber coatings are potentially capable of retaining their low energy surface indefinitely.

The silicone rubber fouling-resistant coatings are generally based on a hydroxy-functional polydiorganosiloxane, usually an alpha, omega-dihydroxypolydiorganosiloxane, or a material which is hydrolysable to such a hydroxy-functional polydiorganosiloxane. These hydroxy-functional polydiorganosiloxanes, sometimes known as silicone gums, are curable through their hydroxy groups, and fouling-resistant coating compositions based on them include a crosslinking agent reactive with SiOH groups or hydrolysable to a substance reactive with SiOH groups. EP-B-32597 and EP-A-329375 describe two-pack compositions in which a crosslinking agent such as ethyl silicate is packaged separately from the hydroxy-functional polydiorganosiloxane. Single-pack compositions in which the crosslinking agent contains hydrolysable groups such as acyloxy or ketiminoxy groups are described for example in U.S. Pat. No. 4,525,565 and EP-B-32597.

Such single-pack compositions have the disadvantage that substantial excess of the crosslinking agent needs to be used to obtain a storage-stable composition as taught by U.S. Pat. No. 4,973,623. If the molar ratio of crosslinking agent to the silicon-bonded hydroxyl groups of the hydroxy-functional polydiorganosiloxane is low, the composition is liable to gelation on storage.

SUMMARY OF THE INVENTION

We have found that an increased level of silicon-bonded hydrolysable groups provided by the crosslinking agent in the coating after curing leads to a decrease in antifouling efficiency. In particular we have found that best antifouling performance is achieved if the amount of crosslinking agent is sufficient to cure the hydroxy-functional polydiorganosiloxane but below the levels which give long-term storage stability.

A coating composition resistant to fouling by aquatic organisms according to a first aspect of the invention comprises an organopolysiloxane composition which cures to an elastomer in the presence of moisture and which comprises a polydiorganosiloxane (A) having a viscosity of 500 to 1,000,000 mPa.s at 25° C. and formed of recurring diorganosiloxy units of the formula —($R_2$)SiO—, where the radicals R, which can be the same or different within each unit and from unit to unit, represent hydrocarbon radicals having 1 to 10 carbon atoms, the polydiorganosiloxane (A) being terminated with silicon-bonded hydrolysable groups and/or being terminated with silicon-bonded hydroxyl groups and mixed with a crosslinking agent (B) for alpha, omega-dihydroxypolydiorganosiloxanes, said crosslinking agent (B) containing at least two silicon-bonded hydrolysable groups per molecule, is characterised in that the coating composition is packed an two separate packages to be mixed before application of the coating composition to an underwater surface, the first of the said packages comprising the polydiorganosiloxane (A) and any crosslinking agent (B) and the second of the said packages comprising (C) an alpha,omega-dihydroxypolydiorganosiloxane having a viscosity of 500 to 10,000 mPa.s at 25° C. and formed of recurring diorganosiloxy units of the formula —($R_2$)SiO—, where R as defined as above, the second package being free of crosslinking agent for the alpha,omega-dihydroxypolydiorganosiloxanes and free of any catalyst for crosslinking between silicon-bonded hydrolysable groups and silicon-bonded hydroxyl groups.

We have found that such a two-package coating composition in which each package contains a polydiorganosiloxane terminated with a reactive group produces coatings which are more resistant to fouling than single-package compositions. The separately packaged alpha,omega-dihydroxypolydiorganosiloxane (C) undergoes a crosslinking reaction with the silicon-bonded hydrolysable groups of the polydiorganosiloxane (A) and/or with the crosslinking agent (B) when the contents of the two packages are mixed, so that the silicone rubber film formed on the underwater surface is believed to be a crosslinked block copolymer of the polydiorganosiloxanes (A) and (C).

A coating composition resistant to fouling by aquatic organisms according to a second aspect of the invention comprises an organopolysiloxane composition which cures to an elastomer in the presence of moisture and which comprises an alpha, omega-dihydroxypolydiorganosiloxane (A) having a viscosity of 500 to 1,000,000 mPa.s at 25° C., and formed of recurring diorganosiloxy units of the formula —($R_2$)SiO—, where the radicals R, which can be the same or different within each unit and from unit to unit, represent hydrocarbon radicals having 1 to 10 carbon atoms, and a crosslinking agent (B) for alpha, omega-dihydroxypolydiorganosiloxanes, said crosslinking agent (B) containing at least two silicon-bonded ketiminoxy groups per molecule, characterised in that the alpha, omega-dihydroxypolydiorganosiloxane (A) and the crosslinking agent (B) are packed in separate packages to be mixed before application of the coating composition to an underwater surface and the ratio of moles of crosslinking agent (B) to moles of silicon-bonded hydroxyl groups in polydiorganosiloxane (A) is in the range 0.7:1 to 1.5:1.

A process according to the invention for coating an underwater surface as defined above with an organopolysiloxane composition to inhibit fouling of the surface by aquatic organisms is characterised in that the two separately packaged components of a coating composition as defined above are mixed and the mixed composition is applied to the underwater surface within 8 hours of mixing.

In a process according to the first aspect of the invention, said organopolysiloxane composition comprises a polydiorganosiloxane (A) having a viscosity of 500 to 1,000,000 mPa.s at 25° C., and formed of recurring diorganosiloxy units of the formula —(R$_2$)SiO—, where the radicals R, which can be the same or different within each unit and from unit to unit, represent hydrocarbon radicals having 1 to 10 carbon atoms, the polydiorganosiloxane (A) being terminated with silicon-bonded hydrolysable groups and/or being terminated with silicon-bonded hydroxyl groups and mixed with a crosslinking agent (B) for alpha, omega-dihydroxypolydiorganosiloxanes, said crosslinking agent (B) containing at least two silicon-bonded hydrolysable groups per molecule, and is characterised in that the polydiorganosiloxane (A) and crosslinking agent (B) are combined and an alpha,omega-dihydroxypolydiorganosiloxane (C) having a viscosity of 500 to 10,000 mPa.s at 25° C. and formed of recurring diorganosiloxy units of the formula —(R$_2$)SiO—, where R is defined as above, is mixed with the resulting combination and the mixed composition is applied to the underwater surface within 8 hours of said mixing and is allowed to cure on the surface in the presence of moisture to form an elastomer.

According to the second aspect of the invention, a process for coating an underwater surface as defined above with an organopolysiloxane composition to inhibit fouling of the surface by aquatic organisms, said organopolysiloxane composition comprising an alpha, omega-dihydroxypolydiorganosiloxane (A) having a viscosity of 500 to 1,000,000 mPa.s at 25° C., and formed of recurring diorganosiloxy units of the formula —(R$_2$)SiO—, where the radicals R, which can be the same or different within each unit and from unit to unit, represent hydrocarbon radicals having 1 to 10 carbon atoms, and a crosslinking agent (B) for alpha, omega-dihydroxypolydiorganosiloxanes, said crosslinking agent (B) containing at least two silicon-bonded ketiminoxy groups per molecule, is characterised in that the crosslinking agent (B) and the alpha, omega-dihydroxypolydiorganosiloxane (A) are mixed at a ratio of moles of crosslinking agent (B) to moles of silicon-bonded hydroxyl groups in polydiorganosiloxane (A) in the range 0.7:1 to 1.5:1 and the resulting mixture is allowed to cure on the surface in the presence of moisture to form an elastomer.

DETAILED DESCRIPTION

The polydiorganosiloxane (A) preferably has a viscosity of at least 700 mPa.s at 25° C., most preferably at least 1000 mPa.s up to 100,000 mPa.s. This polymer may contain monoorganosiloxy groups of the formula RSiO$_{1.5}$ and/or siloxy groups of the formula SiO$_2$ in a maximum proportion of 2% with respect to the number of diorganosiloxy groups R$_2$SiO. The polydiorganosiloxane (A) may comprise a mixture of polydiorganosiloxanes differing in molecular weight and/or in the nature of the groups bonded to the individual silicon atoms.

The dihydroxypolydiorganosiloxane (C) preferably has a viscosity of 5,000 mPa.s or less, to ensure easy mixing with the components in the first package, and preferably has a viscosity of at least 700 mPa.s. It may be a blend of two or more alpha,omega-dihydroxypolydiorganosiloxanes having different viscosities preferably each within the range 500 to 10,000 mPa.s. The siloxane polymer (C) is preferably a substantially unbranched alpha, omega-dihydroxypolydiorganosiloxane of the formula HO—Si(R$_2$)—O—(Si(R$_2$)—O)$_n$—Si(R$_2$)—OH, where n is an integer such that (C) has the required viscosity.

The hydrocarbon radicals represented by the symbol R in the polydiorganosiloxanes (A) and (C) may suitably be selected from alkyl radicals such as methyl, ethyl, n-propyl, isopropyl, n-butyl, n-pentyl, n-hexyl, 2-ethylhexyl or n-octyl, cycloalkyl radicals having from 4 to 8 carbon atoms such as cyclopentyl, cyclohexyl or methylcyclohexyl, alkenyl radicals having from 2 to 4 carbon atoms such as vinyl, allyl or buten-2-yl, and aryl radicals having from 6 to 8 carbon atoms such as phenyl, tolyl or xylyl. Preferably the hydrocarbon radicals R are selected from methyl or other lower alkyl radicals such as ethyl or butyl, and phenyl radicals. Most preferably at least 50% of the total radicals R in the polydiorganosiloxanes (A) and (C) are methyl radicals. For best antifouling performance it is preferred that one or both of the polydiorganosiloxanes (A) and (C) contains phenyl radicals. The proportion of the total radicals R in the polydiorganosiloxanes (A) and (C) which are phenyl radicals is preferably at least 0.1% and may be up to 10%, for example 0.2 to 5%.

Preferred examples of the groups represented by R$_2$SiO are (CH$_3$)$_2$SiO, CH$_3$(C$_6$H$_5$)SiO and (C$_6$H$_5$)$_2$SiO.

Alpha, omega-dihydroxypolydiorganosiloxanes are available commercially. They can readily be prepared by well known techniques described for example in FR-A-1134005, FR-A-1198749 and FR-A-1226745. The siloxane polymers are preferably separated from volatile by-products before use, for example by the devolatilisation process described in U.S. Pat. No. 4,356,116.

According to one preferred embodiment of the invention, the polydiorganosiloxane (A) contains methyl radicals and phenyl radicals and the alpha, omega-dihydroxypolydiorganosiloxane (C) is a polydimethylsiloxane containing no phenyl radicals. For example, up to 5%, preferably 0.2 to 2%, of the radicals R in the polydiorganosiloxane (A) may be phenyl radicals. The cured coating is then believed to be a block copolymer of the methyl phenyl polydiorganosiloxane (A) and the polydimethylsiloxane (C).

In an alternative embodiment of the invention, the polydiorganosiloxane (A) is a polydimethylsiloxane containing no phenyl radicals and the alpha,omega-dihydroxypolydiorganosiloxane (C) contains methyl radicals and phenyl radicals, for example 0.2 to 10% phenyl radicals.

The phenyl radicals present in the alpha,omega-dihydroxypolydiorganosiloxane (A) and/or (C) can be present in mixed units, for example as methyl phenyl siloxy units CH$_3$(C$_6$H$_5$)SiO, but are preferably present as diphenylsiloxy units (C$_6$H$_5$)$_2$SiO.

The alpha,omega-dihydroxypolydiorganosiloxane (C) is preferably used in an amount of at least 10%, most preferably at least 20%, based on the weight of the polydiorganosiloxane (A). The alpha,omega-dihydroxy-polydiorganosiloxane (C) can for example be used at up to 300% by weight based on (A), preferably up to 100% and most preferably up to 50%.

If the polydiorganosiloxane (A) is terminated with silicon-bonded hydrolysable groups it can for example be terminated with ketiminoxy groups, acyloxy groups or amine groups. The polydiorganosiloxane (A) is preferably formed by combining an alpha,omega-dihydroxypolydiorganosiloxane with a crosslinking agent (B), which contains at least two silicon-bonded hydrolysable groups per molecule. The crosslinking agent (B) preferably has an average of at least 2.5 or 3 silicon-bonded hydrolysable groups per molecule. The hydrolysable groups can for example be ketiminoxy groups or acyloxy groups. Reaction between the silicon-bonded hydroxyl groups of the alpha,omega-dihydroxypolydiorganosiloxane and the silicon-bonded hydrolysable groups of the crosslinking agent generally takes place as these materials are combined, so that the polydiorganosiloxane (A) is at least partially terminated with silicon-bonded hydrolysable groups. The polydiorganosiloxane may retain some silicon-bonded hydroxyl groups.

When the polydiorganosiloxane (A) and crosslinking agent (B) are combined to form one package of the coating composition according to the first aspect of the invention, the crosslinking agent (B) is used in stoichiometric excess, that is to say an excess of silicon-bonded hydrolysable groups of crosslinking agent (B) over silicon-bonded hydroxyl groups of poly diorganosiloxane (A). The molar ratio of moles of crosslinking agent (B) to silicon-bonded hydroxyl groups of polydiorganosiloxane (A) is generally at least 1:1 and preferably at least 1.5:1 to ensure storage stability of the first package formed from polydiorganosiloxane (A) and crosslinking agent (B). The resulting composition usually includes crosslinking agent (B) which is not yet chemically combined with the polydiorganosiloxane. For maximum storage stability the said molar ratio is preferably in the range 4:1 to 7:1 as described in U.S. Pat. No. 4,973,623. To achieve these molar ratios the crosslinking agent (B) is usually used at 0.5 to 20% by weight based on the polydiorganosiloxane (A).

The crosslinking agent (B) in stoichiometric excess over silicon-bonded hydroxyl groups in the dihydroxypolydiorganosiloxane (A) ensures that when the coating composition is cured on a substrate, the alpha,omega-dihydroxypolydiorganosiloxane (C) becomes crosslinked into the cured silicone rubber coating. The crosslinking agent (B) is preferably used in stoichiometric excess of silicon-bonded hydrolysable groups over total silicon-bonded hydroxyl groups in dihydroxypolydiorganosiloxanes (A) and (C). The molar ratio of silicon-bonded hydrolysable groups in the crosslinking agent (B) to total silicon-bonded hydroxyl groups in the polydiorganosiloxanes (A) and (C) is preferably at least 2:1. The molar ratio of moles of crosslinking agent (B) to total silicon-bonded hydrolysable groups in (A) and (C) is preferably at least 0.7:1 to ensure thorough cure of the coating composition when applied to the underwater surface, but is less than 1.5:1 and most preferably less than 1.3:1 to achieve the best resistance to fouling by aquatic organisms.

When the polydiorganosiloxane (A) and crosslinking agent (B) are packaged separately according to the second aspect of the invention, the molar ratio of silicon-bonded hydrolysable groups in the crosslinking agent (B) to silicon-bonded hydroxyl groups in the polydiorganosiloxane (A) is preferably at least 2:1. The ratio of moles of crosslinking agent (B) to moles of silicon-bonded hydroxyl groups in polydiorganosiloxane (A) is at least 0.7:1 to ensure curing of the coating composition. This molar ratio is less than 1.5:1 to achieve improved antifouling performance, and is preferably less than 1.3:1.

One example of a preferred crosslinking agent (B) is a ketiminoxysilane having the general formula $(Y^1)_f SiZ^1_{(4-f)}$ in which:

$Y^1$ represents a hydrocarbon radical having 1 to 10 carbon atoms, which may be substituted by halogen or cyano;

$Z^1$ represents a hydrolysable radical of the formula:

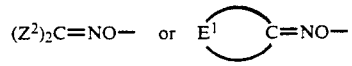

in which the groups $Z^2$, which can be the same or different represent $C_1$-$C_8$ hydrocarbon radicals and $E^1$ represents a $C_4$-$C_8$ alkylene radical; the groups $Z^1$ being the same or different; and f represents 0 or 1.

Examples of groups $Y^1$ are those listed above as examples of group R in the units $R_2SiO$.

Examples of groups $Z^2$ are alkyl radicals such as methyl, ethyl, propyl, isopropyl, butyl, isobutyl, 2-ethylhexyl or octyl, cycloalkyl radicals such as cyclopentyl, cyclohexyl or methylcyclohexyl and aryl radicals such as phenyl, tolyl or xylyl.

Examples of alkylene radicals $E^1$ are: $-(CH_2)_4-$, $-(CH_2)_5-$, $-(CH_2)_6-$, $-(CH_2)_7-$, $-CH_2-CH(C_2H_5)(CH_2)_3-$ and $-CH_2-CH_2-CH_2-CH(CH_3)-CH_2CH_2-$.

Examples of ketiminoxysilanes useful as crosslinking agent (B) are those of the formulae:

$CH_3Si[ON=C(CH_3)_2]_3$, $CH_3Si[ON=C(CH_3)C_2H_5]_3$,
$(CH_2=CH)Si[ON=C(CH_3)C_2H_5]_3$,
$C_6H_5Si[ON=C(CH_3)_2]_3$,
$CH_3Si[ON=C(C_2H_5)(CH_2)_3CH_3]_3$,
$(CH_3)_2C=NOSi[ON=C(CH_3)C_2H_5]_3$

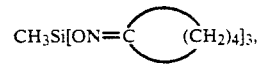

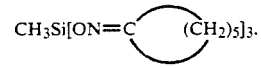

$Si[ON=C(C_2H_5)(CH_3)]_4$ or $Si[ON=C(CH_3)_2]_4$ and their mixtures.

An alternative crosslinking agent (B) is an acyloxysilane of the general formula $(Y^1)_a Si(OCOR^1)_{4-a}$ where $Y^1$ is defined as above and $R^1$ represents hydrocarbon radicals without aliphatic unsaturation, for example alkyl radicals having from 1 to 15 carbon atoms such as methyl, ethyl, n-pentyl, 3-heptyl, or n-pentadecyl, cycloalkyl radicals having 5 or 6 nuclear carbon atoms such as cyclopentyl or cyclohexyl, or aryl radicals having from 6 to 8 carbon atoms such as phenyl, tolyl or xylyl, the radicals $R^1$ being the same or different, and a is 0 or 1.

Examples of acyloxysilanes suitable as crosslinking agents (B) are the following:

$CH_3Si(OCOCH_3)_3$
$C_2H_5Si(OCOCH_3)_3$
$CH_2=CHSi(OCOCH_3)_3$
$C_6H_5Si(OCOCH_3)_3$
$CH_3Si[OCOCH(C_2H_5)(CH_2)_3-CH_3]_3$
$CF_3CH_2CH_2Si(OCOC_6H_5)_3$
$CH_3Si(OCOCH_3)_2OCOCH(C_2H_5)(CH_2)_3CH_3$ and
$CH_3COOSi[OCOCH(C_2H_5)(CH_2)_3CH_3]_3$.

The combination of a ketiminoxysilane crosslinking agent (B) with an alpha,omega-dihydroxypolydiorganosiloxane generally produces a polydiorganosiloxane (A) tipped with silicon-bonded ketiminoxy groups, and the combination of an acyloxysilane crosslinking agent (B) with an alpha,omega-dihydroxypolydiorganosiloxane generally produces a polydiorganosiloxane (A) tipped with silicon-bonded acyloxy, e.g. acetate, groups.

An alternative polydiorganosiloxane (A) terminated with silicon-bonded hydrolysable groups is an amine-tipped polydiorganosiloxane, for example an alpha,omega-diaminopolydiorganosiloxane of the formula:

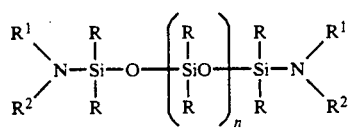

where R is defined as above, n is an integer such that the polydiorganosiloxane has the required viscosity, and $R^1$ and $R^2$ each represent hydrogen or a monovalent hydrocarbon group having 1 to 10 carbon atoms. Most preferably $R^1$ represents hydrogen and $R^2$ represents an alkyl group having 2 to 6 carbon atoms, for example ethyl, propyl, isopropyl, n-butyl or sec-butyl (but-2-yl). Examples of amine-terminated polydiorganosiloxanes are sold under the Trade Marks "Silgan 500" and "Silgan 501J".

The coating composition generally includes a catalyst for the crosslinking reaction between the silicon-bonded hydrolysable groups of crosslinking agent (B) and the silicon-bonded hydroxyl groups of polydiorganosiloxanes (A) and (C) Such a catalyst is generally also a catalyst for crosslinking between silicon-bonded hydroxyl groups in the presence of moisture. The catalyst can be incorporated with polydiorganosiloxane (A) and crosslinking agent (B) in the first of the said packages according to the invention, provided that the crosslinking agent (B) is used in sufficient stoichiometric excess such as a molar ratio of crosslinking agent (B) to silicon-bonded hydroxyl groups of polydiorganosiloxane (A) of at least 1.25:1, preferably at least 1.5:1. As stated above, the second package containing polydiorganosiloxane (C) should not contain any such catalyst. Alternatively, the catalyst can be stored separately from both of the said packages and can be mixed with the combination of polydiorganosiloxane (A) and crosslinking agent (B) within 8 hours before the coating composition is applied to the underwater surface. In this case the catalyst can be mixed with (A) and (B) either before or after the polydiorganosiloxane (C) is mixed with (A) and (B). Separate storage of the catalyst may be used to give maximum storage life of the first package comprising polydiorganosiloxane (A) and crosslinking agent (B) and/or to allow the use of a lower ratio of crosslinking agent (B) to polydiorganosiloxane (A) in the said first package.

When the alpha, omega-dihydroxypolydiorganosiloxane (A) and the crosslinking agent (B) are stored in separate packages, the catalyst can be packaged with the crosslinking agent (B). The package containing the alpha, omega-dihydroxypolydiorganosiloxane (A) should not contain any catalyst.

Examples of suitable catalysts include metallic and organometallic salts of carboxylic acids. Metallic salts may be salts of lead, tin, nickel, cobalt, iron, sodium, chromium, zinc or manganese, for example stannous octoate. Preferred organometallic salts are diorganotin carboxylates such as dibutyltin dilaurate or dibutyltin diacetate, which can be used for example at 0.004 to 0.5% by weight based on the polydiorganosiloxane (A). Alternative catalysts which can be used are organic titanium or zirconium compounds of the type described in U.S. Pat. No. 4,525,565, for example $Ti(O-n-C_4H_9)_4$; $Ti(OSi(CH_3)_3)_4$; $(n-C_4H_9O)_2Ti(OSi(CH_3)_3)_2$;$(CH_3)_2CHOTi(OCOC_{17}H_{35})_3$; a polytitanoxane carboxylate of the formula—$(OTi(OCOCH(C_2H_5)(CH_2)_3CH_3)_2)$—; and $Zr(O-n-C_3H_7)_4$. The organic titanium or zirconium catalysts are preferably used at 0.004 to 0.1% by weight based on the dihydroxypolydiorganosiloxane (A).

An alternative catalyst system which contains no metallic compounds comprises 0.1 to 10 wt % of an aminoalkylsilane and 0.001 to 1 wt % of a substituted hydroxylamine. Examples of preferred aminoalkylsilanes are:

$(CH_3O)_3Si(CH_2)_3NH(CH_2)_2NH_2$; $(CH_3OCH_2CH_2O)_3Si(CH_2)_2NH_2$; $(C_2H_5O)_3Si(CH_2)_3NH_2$; $(CH_3OCH_2CH_2O)_3Si(CH_2)_3NH_2$; $(C_2H_5O)_3Si(CH_2)_3O(CH_2)_3NH_2$; $(C_2H_5O)_2C_6H_5Si(CH_2)_3NH_2$; $(C_2H_5O)_3SiCH_2O(CH_2)_2NH_2$; $(C_2H_5O)_3Si(CH_2)_3O(CH_2)_2NH_2$; $(C_2H_5O)_2CH_3Si(CH_2)_3NH_2$; and $(CH_3O)_3Si(CH_2)_3NH_2$.

The aminoalkylsilane is preferably used at 0.5 to 5% by weight based on the polydiorganosiloxane (A). The hydroxylamine can for example be: N,N-dimethylhydroxylamine, N,N-diethylhydroxylamine, N,N-dibutylhydroxylamine, N-methyl N-phenylhydroxylamine, N,N-diphenylhydroxylamine, N-hydroxymorpholine, N-hydroxypiperidine or N-hydroxypyrrolidine. The substituted hydroxylamine is preferably used at 0.01 to 0.5% by weight based on the polydiorganosiloxane (A). Such an alternative catalyst system can be used if there is a particular requirement for a totally metal-free coating but the presence of amino groups in the catalyst detracts from optimum antifouling performance.

The coating composition preferably contains at least one mineral filler in an amount of up to 250% based on the combined weight of the polydiorganosiloxanes (A) and (C). The mineral filler is preferably used at 2 to 200% by weight based on the polydiorganosiloxanes (A) and (C).

The filler can be a very finely divided material of average particle diameter below 0.1 micron. Examples of such fillers are fumed silica and precipitated silica; these generally have a specific surface (BET) of above 40 m²/g.

The filler can alternatively be of particle diameter above 0.1 micron. Examples of such fillers are pulverised quartz, diatomaceous silica, calcium carbonate, calcined clay, rutile $TiO_2$, an oxide of iron, zinc, chromium, zirconium or magnesium, alumina (which may be hydrated or not), boron nitride, lithopone, barium metaborate, barium sulphate and glass microballoons. Their specific surface is generally less than 30 m²/g. Colouring pigments such as phthalocyanine pigments can also be present and are generally of this larger particle size.

The filler can have its surface modified by treatment with any of a variety of organosilicon compounds conventionally used for this purpose, for example an organochlorosilane, a diorganocyclopolysiloxane, a hexaorganodisiloxane or a hexaorganodisilazane. Such surface treatment compounds are described for example in FR-A-1136884, FR-A-1136885, FR-A-1236505 or GB-A-1024434. The modified fillers usually contain 3 to 30% by weight of the organosilicon compound.

The filler can comprise a mixture of different materials of different particle size, for example 5 to 95% by weight finely divided silica of specific surface above 40 m²/g, which is preferably surface modified, with 95 to 5% silica of larger particle size or calcium carbonate, which may be surface-modified or not. In general, the filler can be present in either component of the two-package coating composition or in both.

The package containing polydiorganosiloxane (A) preferably contains 1 to 50% by weight based on the polydiorganosiloxane (A), most preferably 2 to 10%, of precipitated silica or fumed silica treated by an organosilicon compound, especially when the polydiorganosiloxane (A) is dispersed in an organic diluent. The package containing polydiorganosiloxane (C) may contain a similar percentage, based on the dihydroxypolydiorganosiloxane (C), of precipitated or fumed silica treated by an organosilicon compound, especially when the dihydroxypolydiorganosiloxane (C) is dispersed in an organic diluent. When other fillers or pigments are used, they are preferably not included in the package in which a polydiorganosiloxane (A) and crosslinking agent (B) are combined, unless they are surface modified by an organosilicon compound or subjected to a special drying treatment. Commercially available pigments and fillers may contain significant amounts of surface moisture, and could promote some premature crosslinking if included in the same package as the polydiorganosiloxane (A), crosslinking agent (B) and catalyst. Such pigments and fillers can generally be packaged with the hydroxy-terminated polydiorganosiloxane (C). Similarly they can be mixed with a hydroxy-terminated polydiorganosiloxane (A) in a two-pack composition in which polydiorganosiloxane (A) is packaged separately from the crosslinking agent (B) and catalyst.

The coating composition of the invention preferably contains 1 to 50%, based on the total weight of polydiorganosiloxanes, of a non-reactive silicone oil of the formula:

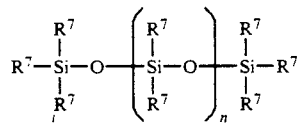

where each group $R^7$ represents a hydrocarbon radical having 1 to 10 carbon atoms, at least 10% of the groups $R^7$ being methyl groups and at least 2% of the groups $R^7$ being phenyl groups, and n is an integer such that the silicone oil has a viscosity of 20 to 5000 mPa.s. The non-reactive silicone oil improves the resistance of the composition to aquatic fouling, as disclosed by GB-A-1470465.

The non-reactive silicone oil is preferably a methyl phenyl silicone oil in which at least 25% of the

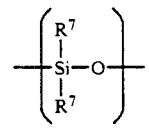

units are methylphenylsiloxane units. Most preferably it is a methyl-terminated poly(methylphenylsiloxane). The oil preferably has a viscosity of 20 to 1000 mPa.s and is preferably used at 2 to 20% by weight based on the polydiorganosiloxanes (A) and (C). An example of a preferred silicone oil is that sold under the Trade Mark "Rhodorsil Huile 550".

The non-reactive silicone oil can be included in either package of the coating composition, or in both.

Alternatively, or additionally, the coating composition may contain a non-reactive fluid organic compound which may improve the resistance of the composition to aquatic fouling, as disclosed for example in GB-A-1581727 or GB-A-2141436. Examples of organic fluids which can be used are lubricating mineral oils such as white oil, low molecular weight polybutene, petrolatum or a liquid paraffin/petrolatum mixture.

Each of the packages of the coating composition of the invention can be prepared by intimate mixing of the ingredients with or without heating. The first package can be prepared by mixing an alpha,omega-dihydroxypolydiorganosiloxane (A), a crosslinking agent (B), catalyst and any filler, pigment and non-reactive silicone oil or fluid organic compound which is to be included in the first package. Care should be taken to exclude moisture, particularly when preparing the said first package.

The two components of the coating composition thus prepared are packaged separately, for example in conventional drums or cans used for paint. The compositions obtained by mixing may be used as they are or in the form of dispersions in an organic diluent. Suitable diluents preferably are conventional commercially available products chosen from among, for example: aliphatic, cycloaliphatic or aromatic hydrocarbons which are optionally halogenated such as n-heptane, n-octane, cyclohexane, methylcyclohexane, toluene, xylene, mesitylene, cumene, tetrahydronaphthalene, perchloroethylene, trichloroethane, tetrachloroethane, chlorobenzene and orthodichlorobenzene; aliphatic or cycloaliphatic ketones such as methylethylketone, methylisobutylketone, methylisoamylketone, cyclohexanone and isophorone; and esters such as ethyl acetate, butyl acetate and ethoxyethyl acetate. Mixtures of diluents can be used, for example a hydrocarbon diluent can be mixed with a more polar organic diluent such as a ketone.

The quantities of the diluents introduced are generally such as to obtain stable dispersions which can be spread easily over substrates, for example by paint spray apparatus, to form coatings 5 to 300 microns thick. Such quantities depend essentially on the nature and viscosity of the initial polydiorganosiloxane compositions. They may vary within large proportion, for example each package may contain from 5 to 150% by weight diluent based on the weight of polydiorganosiloxane (A) or (C) in that package. When the crosslinking agent (B) is packaged separately from the polydiorganosiloxane (A), it is usually dissolved in an organic solvent chosen from the diluents listed above. Since the volume of crosslinking agent (B) is generally small compared to that of polydiorganosiloxane (A), it may be preferred to use a substantial excess of solvent in the package containing crosslinking agent (B). The solvent can for example be used at 0.5 to 20 times the weight of crosslinking agent (B).

The two packages are mixed shortly before application of the coating composition to the substrate, generally no more than 8 hours before application and preferably no more than 2 hours before application. They can be mixed in a container and then applied by spray, roller or brush or can be mixed during application in a twin feed spray, for example a twin-feed airless spray. The underwater surface to be coated is preferably pretreated with a tie coat which has good adhesion to substrates, for example surfaces coated with anticorrosive paint or concrete surfaces, and to which the polydiorganosiloxane composition adheres well. Such a tie coat can be based on a silicone resin containing an adhesion promoter such as an aminosilane, for example that sold under the Trade Mark "Intersleek Tie-Coat".

The compositions according to the invention harden at ambient temperatures (after the removal of the solvents in the case of dispersions) in the presence of moisture to form elastomers. Water vapour present in the atmosphere generally provides sufficient moisture, especially at coastal locations. Air laden with water vapour can be caused to flow over the coated surface if required. The hardening time is usually between 5 minutes and 8 hours; it depends on various factors including the exact composition, the thickness of the coating and the speed at which the diluent evaporates.

The coatings of the invention can also be used as coatings preventing the adhesion of ice, for example on the superstructure of ships.

The invention is illustrated by the following Examples in which parts and percentages are by weight.

EXAMPLES 1 TO 4

Preparation of first package 100 parts of an alpha, omega-dihydroxypolydimethylsiloxane having a number average molecular weight of 19,200 and 8 parts of a hydrophobic surface-treated fumed silica of specific surface 200 m$^2$/g were fed to a 3-bladed mixer. 3 parts methyl tris(methyl ethyl ketiminoxy) silane, 3 parts vinyl tris (methyl ethyl ketiminoxy) silane, 5 parts an alpha, omega-dihydroxypoly(dimethyl)(diphenyl)siloxane having a number average molecular weight of 11,400 and containing 13% diphenylsiloxy units and 3 parts methyl-terminated polydimethylsiloxane were added and the composition was mixed at 150 r.p.m. for 10 minutes. 0.08 part dibutyl tin dilaurate was added and mixed for 1 minute at atmospheric pressure then 5 minutes at a reduced pressure reaching an absolute pressure of about 3KPa. Nitrogen was introduced up to atmospheric pressure. The fluid silicone rubber composition produced had a viscosity of about 7000 mPa.s. The molar ratio of ketiminoxysilane crosslinkers to Si—OH groups is 1.73:1.

47.8 parts of the above silicone rubber composition was mixed with 5.0 parts "Rhodorsil Huile 550" methyl-terminated poly(methyl phenyl siloxane) oil and 18.2 parts xylene diluent under anhydrous conditions and was packaged in a paint can.

Preparation of second package 13.5 parts "Rhodorsil 48 V 3500" alpha, omega-dihydroxypolydimethylsiloxane of viscosity 3500 mPa.s at 25° C. was mixed with 8.2 parts pigments and/or fillers and 7.3 parts xylene diluent and packaged in a paint can. The pigments and fillers used in each Example were as follows:

| Example No. | Colour | Pigments and Fillers |
|---|---|---|
| 1 | Black | Black pigment, fumed silica |
| 2 | White | TiO$_2$ |
| 3 | Grey | TiO$_2$, black pigment, silica |
| 4 | Yellow | Yellow pgment, Tio$_2$ |

Coating Composition

The two packages were stored for 3 months without significant increase In viscosity. After this time, the contents of the first and second packages were mixed (weight ratio 71:29, overall molar ratio of ketiminoxysilane crosslinkers to SiOH groups of the alpha,omega-dihydroxypolydiorganosiloxanes used in both packages 1.34:1) and immediately applied to panels for immersion in sea water. The panels were steel panels which had been precoated with "Intersleek Tie-Coat". The panels were suspended from a raft in sea water off Miami, Fla.

In a comparative experiment 75.0 parts of the above silicone rubber composition of the first package were mixed with 6.1 parts "Rhodorsil Huile 550" and 18.9 parts xylene as a single-pack composition and the resulting mixture was applied to similar panels which were suspended from the same raft.

The panels were removed from the water every two months, low-pressure-water rinsed with no scrubbing, and the proportion of the area of the panel which was free from fouling was visually assessed.

The results of the fouling exposure trials at Miami are quoted below. The panels were well rinsed by medium-pressure water hose after 8 months; the resulting increase in fouling-free area indicates that most of the fouling noted was loosely attached and might not stay on the surface of a ship's hull when the ship is moving.

| Example No | % Fouling Free Area Months | | | | | | | |
|---|---|---|---|---|---|---|---|---|
| | 1 | 3 | 5 | 7 | 9 | 11 | 13 | 17 |
| 1 | 97 | 91 | 95 | 69 | 98 | 87 | 49 | 69 |
| 2 | 95 | 93 | 93 | 93 | 93 | 99 | 95 | 77 |
| 3 | 96 | 92 | 91 | 79 | 96 | 83 | 53 | 59 |
| 4 | 97 | 95 | 93 | 64 | 98 | 92 | 67 | 65 |
| Comparative | 94 | 91 | 86 | 47 | 94 | 69 | 53 | 16 |

EXAMPLES 5 TO 7

Preparation of first package

The silicone rubber composition of Example 1 was mixed with "Rhodorsil Huile 550". In the following proportions and packaged in a paint can.

| | Example 5 | Example 6 | Example 7 |
|---|---|---|---|
| Silicone Rubber | 47.4 | 45.0 | 42.9 |
| Huile 550 | 5.3 | 10.0 | 14.3 |
| | 52.7 | 55.0 | 57.2 |

Preparation of second package

"Rhodorsil 48 V 3500" hydroxy-tipped polydimethylsiloxane was mixed with pigments and fillers in a high speed disperser in the following proportions and packaged in a paint can.

|  | Example 5 | Example 6 | Example 7 |
|---|---|---|---|
| Rhodorsil 48 V 3500 | 29.9 | 23.6 | 22.5 |
| Pigments and fillers (TiO$_2$, black pigment, crystalline silica and zeolite) | 19.3 | 18.4 | 17.5 |
| Xylene diluent | 3.1 | 3.0 | 2.8 |
|  | 47.3 | 45.0 | 42.8 |

The two packages were mixed at total parts by weight as shown above. In each Example the molar ratio of ketiminoxysilane crosslinker to total SiOH groups is 1.11:1. The mixture was applied to panels and tested in the sea at Miami as described in Example 1. The comparative Example was the silicone rubber composition used as the first package in Examples 1 to 4. The panels were assessed monthly. The results obtained were as follows.

| | % Fouling Free Area | | | |
|---|---|---|---|---|
| Immersion time in months | Example 5 | Example 6 | Example 7 | Comparative Example |
| 1 | 99 | 99 | 99 | 94 |
| 2 | 98 | 97 | 99 | |
| 3 | 94 | 93 | 99 | 96 |
| 4 | 94 | 96 | 96 | 91 |
| 5 | 98 | 97 | 90 | |
| 6 | 95 | 98 | 97 | 85 |
| 7 | 97 | 99 | 95 | |
| 8 | 91 | 94 | 97 | 75 |
| 9 | 94 | 95 | 92 | |
| 10 | 91 | 90 | 95 | 92 |
| 12 | 59 | 63 | 86 | 88 |
| 14 | 91 | 96 | 97 | 91 |
| 16 | 81 | 99 | 98 | 67 |
| 18 | 98 | 97 | 97 | 32 |
| 20 | 96 | 95 | 96 | 0 |

EXAMPLE 8

40.4% "Rhodorsil 48 V 3500" hydroxy-tipped polydimethylsiloxane was mixed with 7.1% of a hydroxy-tipped polydimethylsiloxane of number average molecular weight 9,400 and viscosity 750 mPa.s ("Rhodorsil 48 V 750"), 5.0% "Rhodorsil Huile 550" and 13.0% xylene diluent.

The resulting composition was mixed with a prepackaged silicone rubber composition having the composition of the first package described in Example 1 to form a coating composition in which the molar ratio of ketiminoxysilane crosslinkers to total SiOH groups was 0.79:1. The coating composition was applied to panels and tested at Miami as described in Example 1.

EXAMPLES 9 AND 10

Following the procedure of Example 8, coating compositions were prepared having the following formulations:

| | % by weight | |
|---|---|---|
| | Example 9 | Example 10 |
| Silicone rubber composition of Example 1 | 45.0 | 42.5 |
| Rhodorsil 48 V 3500 | 38.2 | 36.1 |
| Rhodorsil 48 V 750 | 6.8 | 6.4 |
| Rhodorsil Huile 550 | 10.0 | 15.0 |
| Xylene Diluent | 14.0 | 15.0 |

These compositions both had a molar ratio of ketiminoxysilane crosslinkers to total SiOH groups of 0.79:1. They were applied to test panels and tested at Miami.

The results of the fouling exposure trials of Examples 8 to 10 were as follows:

| | % Fouling Free Area | | |
|---|---|---|---|
| Immersion time in months | Example 8 | Example 9 | Example 10 |
| 1 | 98 | 96 | 99 |
| 3 | 87 | 90 | 94 |
| 5 | 99 | 98 | 97 |
| 7 | 99 | 99 | 98 |
| 9 | 98 | 87 | 92 |
| 11 | 84 | 87 | 92 |
| 13 | 95 | 96 | 99 |
| 15 | 98 | 98 | 96 |
| 17 | 95 | 93 | 96 |
| 19 | 91 | 91 | 95 |
| 20 | 89 | 94 | 98 |

Compositions having the formulations of Examples 8 to 10 were packaged as a single package in sealed cans within 24 hours.

EXAMPLE 11

200 parts "Rhodorsil 48 V 3500" hydroxy-tipped polydimethylsiloxane was used as one package of a coating composition.

3 parts methyl tris (methyl ethyl ketiminoxy) silane and 3 parts vinyl tris (methyl ethyl ketiminoxy) silane were mixed with 0.1 part dibutyl tin dilaurate catalyst to form the other package of the coating composition.

These packaged components were mixed, forming a coating composition having a molar ratio of silane crosslinkers to silicon-bonded hydroxyl groups of 0.94:1. The coating was applied to a panel coated with "Intersleek Tie Coat". The coating formed cured to a non-tacky state in 1 hour 20 minutes, forming a coating resistant to aquatic fouling.

EXAMPLE 12

200 parts "Rhodorsil 48 V 3500" was used as one package of a coating composition.

2.4 parts methyl tris (methyl ethyl ketiminoxy silane) and 2.3 parts vinyl tris (methyl ethyl ketiminoxy) silane were mixed with 0.1 part dibutyl tin dilaurate catalyst to form the other package of the coating composition.

The packaged components were mixed and applied to a panel as described in Example 11. The molar ratio of silane crosslinkers to silicon-bonded hydroxyl groups was 0.73:1.

The coating cured to a non-tacky state in 2 hours 35 minutes.

If the components of Example 11 or of Example 12 are all mixed together in a sealed can, the compositions gel in less than 16 hours.

EXAMPLE 13

The following materials were mixed to form the first package of a coating composition.

|  | Parts by weight |
|---|---|
| Rhodorsil 48 V 3500 | 38.00 |
| Fumed silica | 1.41 |
| Methyl tris (methyl ethyl ketiminoxy) silane | 1.06 |
| Vinyl tris (methyl ethyl ketiminoxy) silane | 1.06 |
| Dibutyl tin dilaurate | 0.03 |
| Rhodorsil Huile 550 | 4.61 |
| Xylene | 5.02 |

The following materials were mixed to form the second package of a coating composition.

|  | Parts by weight |
|---|---|
| Rhodorsil 48 V 3500 | 21.82 |
| Pigments and fillers (silica, titanium dioxide and iron oxide) | 16.99 |
| Xylene | 10.00 |

The packages were mixed to form a coating composition and were applied to a panel coated with "Intersleek Tie Coat". A cured coating resistant to aquatic fouling was formed.

EXAMPLE 14

The following materials were mixed to form the first package of a coating composition.

|  | Parts by weight |
|---|---|
| Rhodorsil 48 V 3500 | 59.82 |
| Fumed Silica | 1.41 |
| Pigments and fillers (as in Example 13) | 16.99 |
| Rhodorsil Huile 550 | 4.61 |
| Xylene | 10.00 |

The following materials were mixed to form the second package of a coating composition.

|  | Parts by weight |
|---|---|
| Vinyl tris (methyl ethyl ketiminoxy) silane | 1.06 |
| Methyl tris (methyl ethyl ketiminoxy) silane | 1.06 |
| Dibutyl tin dilaurate | 0.03 |
| Xylene | 5.02 |

The packages were mixed to form a coating composition and were applied to a panel coated with "Intersleek Tie Coat". A cured coating resistant to aquatic fouling was formed.

The molar ratio of silane crosslinkers to silicon-bonded hydroxyl groups is 1.12:1 in the coating compositions of Examples 13 and 14. These Examples illustrate alternative ways of packaging a coating of the same overall composition in two packages which are both stable on storage.

We claim:

1. A coating composition resistant to fouling by aquatic organisms, comprising an organopolysiloxane composition which cures to an elastomer in the presence of moisture and which comprises a polydiorganosiloxane (A) having a viscosity of 500 to 1,000,000 mPa.s at 25° C. and formed of recurring diorganosiloxy units of the formula $—(R_2)SiO—$, where the radicals R, which can be the same or different within each unit and from unit to unit, represent hydrocarbon radicals having 1 to 10 carbon atoms, the polydiorganosiloxane (A) being terminated with silicon-bonded hydrolysable groups and/or being terminated with silicon-bonded hydroxyl groups and mixed with a stoichiometric excess of a crosslinking agent (B) for alpha, omega-dihydroxypolydiorganosiloxanes, said cross-linking agent (B) containing at least two silicon-bonded hydrolysable groups per molecule, characterised in that the coating composition is packed in two separate packages to be mixed before application of the coating composition to an underwater surface, the first of the said packages comprising the polydiorganosiloxane (A) and any crosslinking agent (B), and the second of the said packages comprising an alpha,omega-dihydroxypolydiorganosiloxane (C) having a viscosity of 500 to 10,000 mPa.s at 25° C. and formed of recurring diorganosiloxy units of the formula $—(R_2)SiO—$, where R is defined as above, the second package being free of crosslinking agent for the alpha, omega-dihydroxypolydiorganosiloxanes and free of any catalyst for cross-linking between silicon-bonded hydrolysable groups and silicon-bonded hydroxyl groups, the ratio of moles of crosslinking agent (B) to total moles of silicon-bonded hydroxyl groups in the polydiorganosiloxane (A) plus polydiorganosiloxane (C) being less than 1.5:1.

2. A coating composition according to claim 1, characterised in that the first of the said packages comprises a combination of an alpha, omega-dihydroxypolydiorganosiloxane with a crosslinking agent (B) which is a ketiminoxysilane.

3. A coating composition according to claim 1, characterised in that the first of the said packages comprises a combination of an alpha, omega-dihydroxypolydiorganosiloxane with a crosslinking agent (B) which is an acyloxysilane.

4. A coating composition according to claim 1, characterised in that the ratio of moles of crosslinking agent (B) to moles of silicon-bonded hydroxyl groups on the polydiorganosiloxane (A) is at least 1.5:1.

5. A coating composition according to claim 1, characterised in that the ratio of moles of cross-linking agent (B) to total moles of silicon-bonded hydroxyl groups in the polydiorganosiloxane (A) plus polydiorganosiloxane (C) is in the range 0.7:1 to 1.3:1.

6. A coating composition according to claim 1, characterised in that the alpha, omega-dihydroxypolydiorganosiloxane (C) is present in an amount of 10 to 300% by weight based on the polydiorganosiloxane (A).

7. A coating composition according to claim 1, characterised in that the alpha, omega-dihydroxypolydiorganosiloxane (C) is present in an amount of 20 to 50% by weight based on the polydiorganosiloxane (A).

8. A coating composition resistant to fouling by aquatic organisms, comprising an organopolysiloxane composition which cures to an elastomer in the presence of moisture and which comprises a polydiorganosiloxane (A) having a viscosity of 500 to 1,000,000 mPa.s at 25° C. and formed of recurring diorganosiloxy units of the formula $—(R_2)SiO—$, where the radicals R, which can be the same or different within each unit and from unit to unit, represent hydrocarbon radicals having 1 to 10 carbon atoms, the polydiorganosiloxane (A) being terminated with silicon-bonded hydrolysable groups and/or being terminated with silicon-bonded hydroxyl groups and mixed with a stoichiometric excess of a crosslinking agent (B) for alpha, omega-dihydroxypolydiorganosiloxanes, said crosslinking agent (B) containing at least two silicon-bonded hydrolysable groups per molecule, characterised in that the coating composition is packed in two separate packages to be mixed before application of the coating composition to an underwater surface, the first of the said packages comprising the polydiorganosiloxane (A) and any crosslinking agent (B), and the second of the said packages comprising an alpha, omega-dihydroxypolydiorganosiloxane (C) having a viscosity of 500 to 10,000 mPa.s at 25° C. and formed of recurring diorganosiloxy units of the formula —$(R_2)SiO$—, where R is defined as above, the second package being free of cross-linking agent for the alpha,omega-dihydroxy-polydiorganosiloxane and free of any catalyst for crosslinking between silicon-bonded hydrolysable groups and silicon-bonded hydroxyl groups, at least 50% of the total radicals R in the polydiorganosiloxanes (A) and (C) being methyl radicals and at least 0.1% of the total radicals R in the polydiorganosiloxanes (A) and (C) being phenyl radicals.

9. A coating composition according to claim 8, characterised in that the polydiorganosiloxane (A) contains methyl radicals and phenyl radicals and the alpha, omega-dihydroxypolydiorganosiloxane (C) is a polydimethylsiloxane containing no phenyl radicals.

10. A coating composition according to claim 8, characterised in that the polydiorganosiloxane (A) is a polydimethylsiloxane containing no phenyl radicals and the alpha, omega-dihydroxypolydiorganosiloxane (C) contains methyl radicals and phenyl radicals.

11. The coating composition according to claim 1, characterised in that the said package containing crosslinking agent (B) also contains a catalyst for the crosslinking reaction between silicon-bonded hydrolysable groups of the crosslinking agent (B) and silicon-bonded hydroxyl groups, the catalyst being a metallic or organometallic salt of a carboxylic acid.

12. A coating composition according to claim 1, characterised in that the composition contains a non-reactive methyl phenyl silicone oil of viscosity 20 to 5000 mPa.s, said non-reactive methyl phenyl silicon oil being present in either the first package or the second package or both and being present at 1 to 50 wt % based on the combined weight of the polydiorganosiloxanes (A) and (C).

13. A process for coating a surface, which is intended to be under water or in contact with water in use, with a polydiorganosiloxane composition to inhibit fouling of the surface by aquatic organisms, said polydiorganosiloxane composition comprising an alpha, omega-dihydroxypolydiorganosiloxane (A) having a viscosity of 500 to 1,000,000 mPa.s at 25° C. and formed of recurring diorganosiloxy units of the formula —$(R_2)SiO$—, where the radicals R, which can be the same or different within each unit and from unit to unit, represent hydrocarbon radicals having 1 to 10 carbon atoms, and a separately packaged crosslinking agent (B) for alpha, omega-dihydroxypolydiorganosiloxanes, said crosslinking agent (B) containing at least two silicon-bonded ketiminoxy groups per molecule, said process comprising mixing the crosslinking agent (B) and the alpha, omega-dihydroxypolydiorganosiloxane (A) at a ratio of moles of crosslinking agent (B) to moles of silicon-bonded hydroxyl groups in the polydiorganosiloxane (A) in the range 0.7:1 to 1.5:1 and applying the resulting mixture to said underwater surface within 8 hours of said mixing and allowing said mixture to cure on the surface in the presence of moisture to form an elastomer, wherein the composition contains a non-reactive methyl phenyl silicone oil of viscosity 20 to 5000 mPa.S, said non-reactive methyl phenyl silicone oil being present in either the first package or the second package or both and being present at 1 to 50 wt % based on the combined weight of the polydiorganosiloxane (A) and crosslinking agent (B).

14. A process according to claim 13, characterised in that the ratio of moles of crosslinking agent (B) to moles of silicon-bonded hydroxyl groups in the polydiorganosiloxane (A) is less than 1.3:1.

15. A process according to claim 13, characterised in that a catalyst for the crosslinking reaction between silicon-bonded hydrolysable groups and silicon-bonded hydroxyl groups is mixed with the crosslinking agent (B) before the said crosslinking agent is mixed with the alpha, omega-dihydroxypolydiorganosiloxane (A).

16. A process for coating a surface, which is intended to be under water in contact with water in use, with a polydiorganosiloxane composition to inhibit fouling of the surface by aquatic organisms, said organopolysiloxane composition comprising a polydiorganosiloxane (A) having a viscosity of 500 to 1,000,000 mPa.s at 25° C. and formed of recurring diorganosiloxy units of the formula —$(R_2)SiO$—, where the radicals R, which can be the same or different within each unit and from unit to unit, represent hydrocarbon radicals having 1 to 10 carbon atoms, the polydiorganosiloxane (A) being terminated with silicon-bonded hydrolysable groups and/or being terminated with silicon-bonded hydroxyl groups and mixed with a stoichiometric excess of a crosslinking agent (B) for alpha, omega-dihydroxypolydiorganosiloxanes, said crosslinking agent (B) containing at least two silicon-bonded hydrolysable groups per molecule, said process comprising mixing the polydiorganosiloxane (A) and any crosslinking agent (B) with a separately packaged alpha, omega-dihydroxypolydiorganosiloxane (C) having a viscosity of 500 to 10,000 mPa.s at 25° C. and formed of recurring diorganosiloxy units of the formula —$(R_2)SiO$—, where R is defined as above, the package comprising polydiorganosiloxane (C) being free of crosslinking agent for the alpha, omega-dihydroxypolydiorganosiloxane (C) and free of any catalyst for crosslinking between silicon-bonded hydrolysable groups and silicon-bonded hydroxyl groups, to form a mixed composition in which at least 50% of the total radicals R in the polydiorganosiloxanes (A) and (C) are methyl radicals and at least 0.1% of the total radicals R in the polydiorganosiloxanes (A) and (C) are phenyl radicals, and applying the mixed composition to the surface within 8 hours of mixing and allowing said mixed composition to cure to an elastomer film on the surface in the presence of moisture.

17. A process according to claim 16, characterised in that the separately packaged components are mixed during application to the surface in a twin-feed spray.

18. A process according to claim 16, characterised in that a catalyst for the crosslinking reaction between silicon-bonded hydrolysable groups and silicon-bonded hydroxyl groups is packaged with the combination of polydiorganosiloxane (A) and crosslinking agent (B) before the said combination is mixed with alpha, omega-dihydroxypolydiorganosiloxane (C).

19. A process according to claim 16, characterised in that a catalyst for the crosslinking reaction between silicon-bonded hydrolysable groups and silicon-bonded hydroxyl groups, packaged separately from the polydiorganosiloxane (A) and crosslinking agent (B) and from the alpha, omega-dihydroxypolydiorganosiloxane (C), is mixed with the combination of polydiorganosiloxane (A) and crosslinking agent (B) within 8 hours before the mixed coating composition is applied to the underwater surface.

20. A coating composition according to claim 8, characterised in that the said package containing crosslinking agent (B) also contains a catalyst for the crosslinking reaction between silicon-bonded hydrolysable groups of the crosslinking agent (B) and silicon-bonded hydroxyl groups.

21. A coating composition according to claim 8, characterised in that the composition contains a non-reactive methyl phenyl silicone oil of viscosity 20 to 5000 mPa.s, said non-reactive methyl phenyl silicone oil being present in either the first package or the second package or both and being present at 1 to 50 wt % based on the combined weight of the polydiorganosiloxanes (A) and (C).

22. A process according to claim 13, characterised in that the separately packaged components are mixed during application to the surface in a twin-feed spray.

* * * * *